United States Patent
Wang et al.

(10) Patent No.: US 10,643,526 B2
(45) Date of Patent: May 5, 2020

(54) DISPLAY UNIT, PIXEL CIRCUIT AND DRIVING METHOD AND DISPLAY PANEL THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Yanfeng Wang, Beijing (CN); Zhenhua L V, Beijing (CN); Zhidong Wang, Beijing (CN); Xiaoling Xu, Beijing (CN); Yuanxin Du, Beijing (CN); Hongshu Zhang, Beijing (CN); Weipin Hu, Beijing (CN); Congcong Wei, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/767,281

(22) PCT Filed: Oct. 13, 2017

(86) PCT No.: PCT/CN2017/106036
§ 371 (c)(1),
(2) Date: Apr. 10, 2018

(87) PCT Pub. No.: WO2018/176798
PCT Pub. Date: Oct. 4, 2018

(65) Prior Publication Data
US 2019/0035326 A1    Jan. 31, 2019

(30) Foreign Application Priority Data

Mar. 31, 2017   (CN) .......................... 2017 1 0206868

(51) Int. Cl.
*G09G 3/20* (2006.01)
*G09G 3/32* (2016.01)
(Continued)

(52) U.S. Cl.
CPC ......... *G09G 3/32* (2013.01); *G02F 1/133514* (2013.01); *G02F 1/136213* (2013.01);
(Continued)

(58) Field of Classification Search
None
See application file for complete search history.

(56) References Cited

U.S. PATENT DOCUMENTS

| | | | |
|---|---|---|---|
| 2005/0052367 A1* | 3/2005 | Miyazawa | G09G 3/3241 345/76 |
| 2010/0245324 A1 | 9/2010 | Minami et al. | |

(Continued)

FOREIGN PATENT DOCUMENTS

| | | |
|---|---|---|
| CN | 103247256 A | 8/2013 |
| CN | 104835451 A | 8/2015 |

(Continued)

OTHER PUBLICATIONS

Office Action from Chinese Application No. 201710206868.0 dated Sep. 30, 2018 (13 pages).

(Continued)

*Primary Examiner* — Parul H Gupta
(74) *Attorney, Agent, or Firm* — Dave Law Group LLC; Raj S. Dave (57) ABSTRACT

The embodiments of the disclosure relate to a display unit, a pixel circuit and a driving method and a display panel thereof. The display unit comprises a display pixel unit for displaying images, and an imaging pixel unit for acquiring (Continued)

images. The imaging pixel unit comprises a photosensitive element and a filter element located on the photosensitive element.

11 Claims, 6 Drawing Sheets

(51) Int. Cl.
G02F 1/155 (2006.01)
G02F 1/1335 (2006.01)
G09G 3/36 (2006.01)
G02F 1/163 (2006.01)
G02F 1/153 (2006.01)
G02F 1/1362 (2006.01)
G09G 3/3225 (2016.01)

(52) U.S. Cl.
CPC ............... *G02F 1/153* (2013.01); *G02F 1/155* (2013.01); *G02F 1/163* (2013.01); *G09G 3/2003* (2013.01); *G09G 3/3648* (2013.01); *G02F 2201/121* (2013.01); *G02F 2201/50* (2013.01); *G02F 2201/58* (2013.01); *G02F 2203/055* (2013.01); *G09G 3/3225* (2013.01); *G09G 3/3677* (2013.01); *G09G 3/3688* (2013.01); *G09G 2300/0842* (2013.01); *G09G 2310/0267* (2013.01); *G09G 2310/0275* (2013.01); *G09G 2360/14* (2013.01)

(56) References Cited

U.S. PATENT DOCUMENTS

| | | | |
|---|---|---|---|
| 2011/0205209 A1* | 8/2011 | Kurokawa | G01J 1/18 345/211 |
| 2011/0261301 A1* | 10/2011 | Noh | G02F 1/1334 349/106 |
| 2015/0146077 A1* | 5/2015 | Keelan | H01L 27/14621 348/342 |
| 2017/0132965 A1 | 5/2017 | Hsu | |
| 2018/0077371 A1 | 3/2018 | Park | |

FOREIGN PATENT DOCUMENTS

| | | |
|---|---|---|
| CN | 105353533 A | 2/2016 |
| CN | 105355640 A | 2/2016 |
| CN | 105510248 A | 4/2016 |
| CN | 105741748 A | 7/2016 |
| CN | 106449716 A | 2/2017 |
| CN | 106847111 A | 6/2017 |
| JP | 200664861 A | 3/2006 |
| JP | 2006284891 A | 10/2006 |

OTHER PUBLICATIONS

Written Opinion from Chinese Application No. PCT/CN2017/106036 dated Jan. 12, 2018 (5 pages).
International Search Report from PCT Application No. PCT/CN2017/106036 dated Jan. 12, 2018 (5 pages).

* cited by examiner

DISPLAY UNIT, PIXEL CIRCUIT AND DRIVING METHOD AND DISPLAY PANEL THEREOF

CROSS-REFERENCE TO RELATED APPLICATIONS

This application claims priority of China Patent Application No. 201710206868.0, filed on Mar. 31, 2017, the entire content of which is incorporated herein by reference as part of this application.

TECHNICAL FIELD

The embodiments of the present disclosure relate to a field of display technology, and in particular, to a display unit, a pixel circuit and a driving method and a display panel thereof.

BACKGROUND

With the progressive development of display technology, the micro-LED (Light Emitting Diode) display technology has gained more and more attention due to the advantages thereof. Micro-LED is derived from LED, but it is the same with OLED (Organic Light Emitting Diode), it also has a self-luminous advantage, while the performances thereof are more improved than those of the OLED. Micro-LED has many advantages, such as power saving, high brightness, long life, low power consumption, high luminous efficiency, fast response, small size and so on. At present, many enterprises have been studying the micro-LED technology.

SUMMARY OF THE DISCLOSURE

The embodiments of the present disclosure provide a display unit, a pixel circuit and a driving method and a display panel thereof, which may realize two functions of image display and image acquisition.

In a first aspect of the present disclosure, there is provided a display unit, comprising: a display pixel unit for displaying images; and an imaging pixel unit for acquiring images.

In an embodiment, the imaging pixel unit comprises a photosensitive element and a filter element located on the photosensitive element.

In an embodiment, the photosensitive element comprises a PIN unit.

In an embodiment, the filter element comprises an electrochromic filter element or a liquid crystal filter element.

In an embodiment, the electrochromic filter element comprises: a first substrate; a second substrate disposed opposite to the first substrate; a common electrode disposed between the first substrate and the second substrate; a first electrode, a second electrode and a third electrode located between the common electrode and the second substrate, the first, second and third electrodes being located in the same layer; and a first electrochromic material located between the common electrode and the first electrode as a first color filter unit through which a first color light transmits, a second electrochromic material located between the common electrode and the second electrode as a second color filter unit through which a second color light transmits, and a third electrochromic material located between the common electrode and the third electrode as a third color filter unit through which a third color light transmits.

In an embodiment, the electrochromic filter element comprises: a first substrate; a first lower electrode located on the first substrate; a first electrochromic material located on the first lower electrode as a first color filter unit through which a first color light transmits; a first upper electrode located on the first electrochromic material; a first protective layer located on the first upper electrode; a second lower electrode located on the first protective layer; a second electrochromic material located on the second lower electrode as a second color filter unit through which a second color light transmits; a second upper electrode located on the second electrochromic material; a second protective layer located on the second upper electrode; a third lower electrode located on the second protective layer; a third electrochromic material located on the third lower electrode as a third color filter unit through which a third color light transmits; a third upper electrode located on the third electrochromic material; and a second substrate located on the third upper electrode.

In an embodiment, the liquid crystal filter element comprises: a first substrate; a second substrate disposed opposite to the first substrate; a first color filter unit, a second color filter unit and a third color filter unit located between the first substrate and the second substrate, the first, second and third color filter units being located in the same layer; a protective layer located between the second substrate and the first, second and third color filter units; a first electrode, a second electrode and a third electrode located between the second substrate and the protective layer, the first, second and third electrodes being located in the same layer; a common electrode located between the second substrate and the first, second and third electrodes; and a liquid crystal located between the common electrode and the first, second and third electrodes.

In an embodiment, the display pixel unit comprises: an LED-based display pixel unit or a liquid crystal-based display pixel unit.

In a second aspect of the present disclosure, there is provided a pixel circuit, comprising: a display unit according to the first aspect of the present disclosure; a storage capacitor; a data write circuit configured to control a data voltage to be written into a first terminal of the storage capacitor; a display control circuit configured to control the display pixel unit in the display unit to display images; and an imaging control circuit configured to control the imaging pixel unit in the display unit to acquire images.

In an embodiment, the data write circuit comprises a first transistor, a control electrode of the first transistor being coupled to a scan line, a first electrode of the first transistor being coupled to a data line, and a second electrode of the first transistor being coupled to the first terminal of the storage capacitor.

In an embodiment, the display control circuit comprises a second transistor, a control electrode of the second transistor being coupled to a second terminal of the storage capacitor, a first electrode of the second transistor being coupled to the display pixel unit, and a second electrode of the second transistor being configured to receive a power supply voltage.

In an embodiment, the imaging control circuit comprises a third transistor, a control electrode of the third transistor being coupled to the scan line, a first electrode of the third transistor being coupled to the imaging pixel unit, and a second electrode of the third transistor being coupled to an imaging signal output terminal.

In an embodiment, the second transistor and the first transistor are of the same type, and the third transistor and the first transistor are of different types.

In a third aspect of the present disclosure, there is provided a method for driving a pixel circuit according to the second aspect of the present disclosure, comprising: in a first period of time, driving the display control circuit to display images; and in a second period of time, driving the imaging control circuit to acquire images.

In a fourth aspect of the present disclosure, there is provided a pixel circuit, comprising: a display unit according to the first aspect of the present disclosure; a storage capacitor; a first transistor; a second transistor; and a third transistor. A control electrode of the first transistor is coupled to a scan line, a first electrode of the first transistor is coupled to a data line, and a second electrode of the first transistor is coupled to a first terminal of the storage capacitor. A control electrode of the second transistor is coupled to a second terminal of the storage capacitor, a first electrode of the second transistor is coupled to a display pixel unit of the display unit, and a second electrode of the second transistor is configured to receive a power supply voltage. A control electrode of the third transistor is coupled to the scan line, a first electrode of the third transistor is coupled to an imaging pixel unit in the display unit, and a second electrode of the third transistor is coupled to an imaging signal output terminal. The second transistor and the first transistor are of the same type, and the third transistor and the first transistor are of different types.

In a fifth aspect of the present disclosure, there is provided a method for driving a pixel circuit according to the fourth aspect of the present disclosure, comprising: in a first period of time, inputting a first voltage signal into the scan line to turn on the first transistor and turn off the third transistor, and inputting a data signal into the data line to charge the storage capacitor to turn on the second transistor to drive the display pixel unit to emit a light; and in a second period of time, inputting a first voltage signal to the scan line to turn on the third transistor and turn off the first and second transistors so as to output an image signal acquired by the imaging pixel unit from the imaging signal output terminal.

In an embodiment, in the second period of time, the imaging pixel unit asynchronously acquires a first image signal of a first color, a second image signal of a second color, and a third image signal of a third color.

In a sixth aspect of the present disclosure, there is provided a display panel, comprising a plurality of pixel circuits according to the second or the fourth aspect of the present disclosure, wherein imaging pixel units of the plurality of pixel circuits are located between display pixel units.

In a seventh aspect of the present disclosure, there is provided a display device, comprising a display panel according to the sixth aspect of the present disclosure.

In an embodiment, the display device further comprises: a filter amplifier for amplifying an image signal from the imaging pixel unit in the display panel; a scan driver and a data driver for driving the display panel; and a controller for receiving the image signal from the filter amplifier and respectively transmitting a scan signal and a data signal to the scan driver and the data driver, and transmitting an imaging control signal for controlling the imaging pixel unit to the display panel.

In the embodiments of the present disclosure, there are provided a display unit, a pixel circuit and a driving method and a display panel thereof, which may realize two functions of image display and image acquisition.

Further aspects and areas of applicability will become apparent from the description provided herein. It should be understood that various aspects of this application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present application.

Corresponding reference numerals indicate corresponding parts or features throughout the several views of the drawings.

DETAILED DESCRIPTION

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

In addition, in the drawings, the thickness and area of each layer are exaggerated for clarity. It should be understood that when a layer, a region, or a component is referred to as being "on" another part, it is meant that it is directly on the another part, or there may be other components in between. In contrast, when a certain component is referred to as being "directly" on another component, it is meant that no other component lies in between.

Further to be noted, when the elements and the embodiments thereof of the present application are introduced, the articles "a/an", "one", "the" and "said" are intended to represent the existence of one or more elements. Unless otherwise specified, "a plurality of" means two or more. The expressions "comprise", "include", "contain" and "have" are intended as inclusive and mean that there may be other elements besides those listed. The terms such as "first" and "second" are used herein only for purposes of description and are not intended to indicate or imply relative importance and the order of formation Example embodiments will now be described more fully with reference to the accompanying drawings.

In the embodiments described herein, there is provided a display unit. The display panel can realize two functions of image display and image acquisition. An exemplary display unit provided by the embodiments of the present disclosure will now be described in detail with reference to FIGS. 1 to 4.

Figure 1:
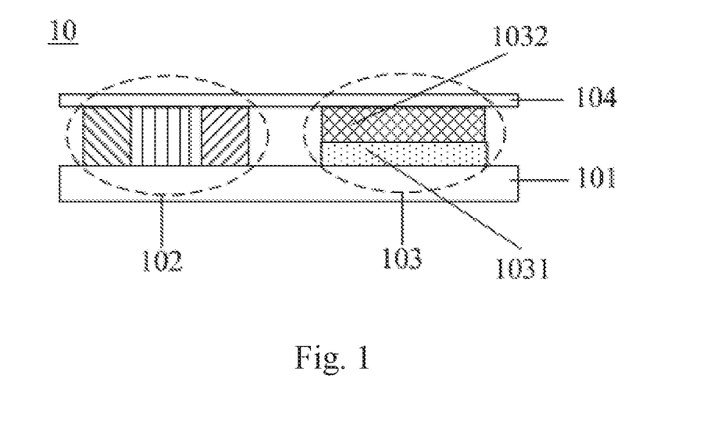
FIG. 1 is a schematic diagram schematically illustrating a cross-section of a display unit 10 according to an embodiment of the present disclosure.

FIG. 1 is a schematic diagram schematically illustrating a cross-section of a display unit 10 according to an embodiment of the present disclosure. As shown in FIG. 1, the display unit 10 comprises a substrate 101, a display pixel unit 102 and an imaging pixel unit 103 located on the substrate 101, and a protective layer 104 located on the display pixel unit 102 and the imaging pixel unit 103. The display pixel unit 102 is configured to display images, and the imaging pixel unit 103 is configured to acquire images.

In an exemplary embodiment, the display pixel unit 102 comprises an LED-based display pixel unit or a liquid crystal-based display pixel unit. In an exemplary embodiment, the LED comprises a micro-LED, an OLED, a liquid crystal LED, or an inorganic LED and the like.

In an exemplary embodiment, the imaging pixel unit 103 comprises a photosensitive element 1031 and a filter element 1032 located on the photosensitive element 1031.

In an exemplary embodiment, the photosensitive element 1031 comprises a PIN unit, wherein the PIN unit is configured to sense brightness of an external image and convert the brightness into an electric signal when acquiring the image.

Figure 2:
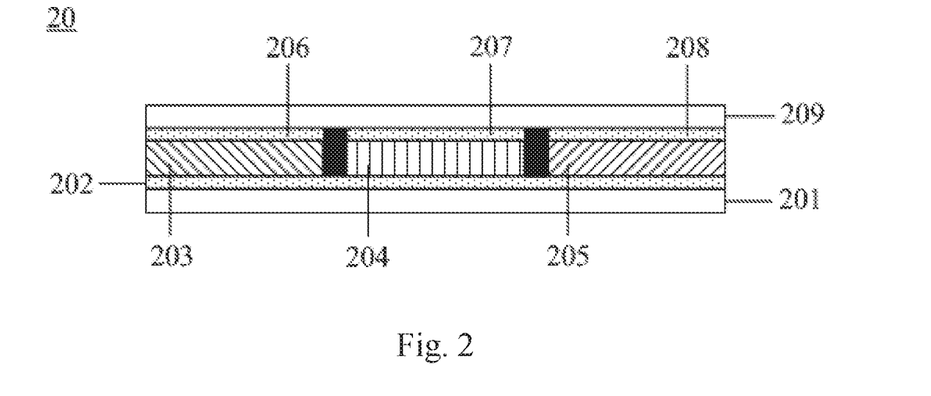
FIG. 2 is a schematic diagram schematically illustrating a cross-section of an electrochromic filter element 20 according to an embodiment of the present disclosure.
Figure 3:
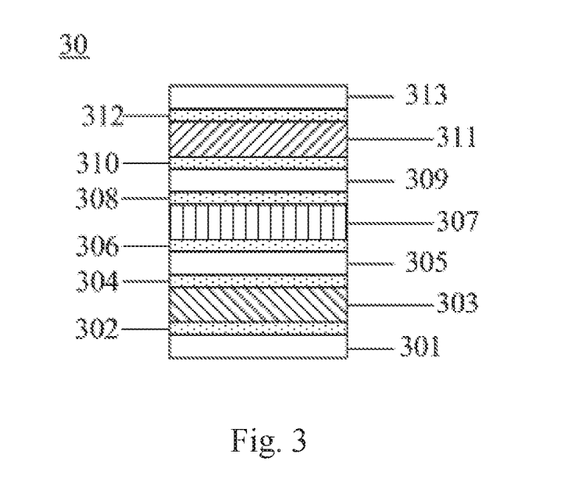
FIG. 3 is a schematic diagram schematically illustrating a cross-section of an electrochromic filter element 30 according to an embodiment of the present disclosure.
Figure 4:
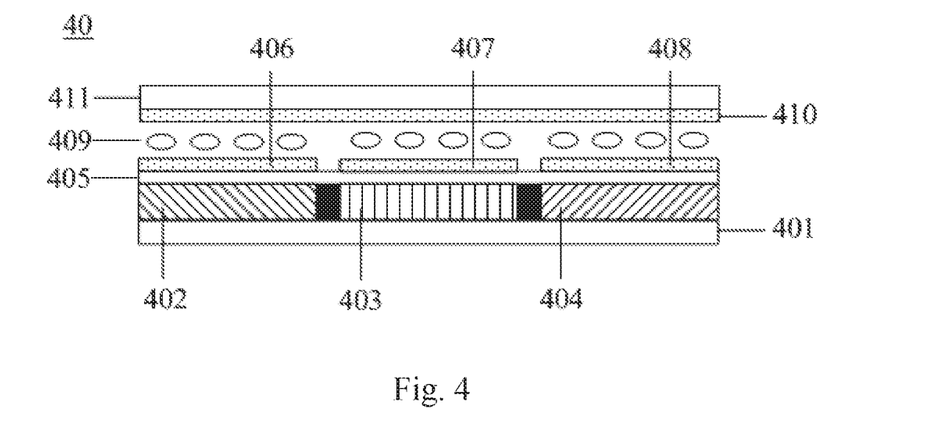
FIG. 4 is a schematic diagram schematically illustrating a cross-section of a liquid crystal filter element 40 according to an embodiment of the present disclosure.

In an exemplary embodiment, the filter element 1032 comprises an electrochromic filter element 20 (as shown in FIG. 2), an electrochromic filter element 30 (as shown in FIG. 3), or a liquid crystal filter element 40 (as shown in FIG. 4).

FIG. 2 is a schematic diagram schematically illustrating a cross-section of an electrochromic filter element 20 according to an embodiment of the present disclosure. As shown in FIG. 2, the electrochromic filter element 20 comprises: a first substrate 201; a second substrate 209 disposed opposite to the first substrate 201; a common electrode 202 disposed between the first substrate 201 and the second substrate 209; a first electrode 206, a second electrode 207 and a third electrode 208 located between the common electrode 202 and the second substrate 209, the first electrode 206, the second electrode 207 and the third electrode 208 being located in the same layer; and a first electrochromic material 203 located between the common electrode 202 and the first electrode 206 as a first color filter unit through which a first color light transmits, a second electrochromic material 204 located between the common electrode 202 and the second electrode 207 as a second color filter unit through which a second color light transmits, and a third electrochromic material 205 located between the common electrode 202 and the third electrode 208 as a third color filter unit through which a third color light transmits. In an exemplary embodiment, a black matrix exists among the first electrochromic material 203, the second electrochromic material 204 and the third electrochromic material 205 to prevent crosstalk of light.

In an exemplary embodiment, the first, second and third color lights may be a red light, a green light and a blue light, respectively. The first electrochromic material 203, the second electrochromic material 204 and the third electrochromic material 205 are asynchronously applied with a voltage so as to asynchronously acquire a red image, a green image and a blue image.

FIG. 3 is a schematic diagram schematically illustrating a cross-section of an electrochromic filter element 30 according to an embodiment of the present disclosure. As shown in FIG. 3, the electrochromic filter element 30 comprises: a first substrate 301; a first lower electrode 302 located on the first substrate 301; a first electrochromic material 303 located on the first lower electrode 302 as a first color filter unit through which a first color light transmits; a first upper electrode 304 located on the first electrochromic material 303; a first protective layer 305 located on the first upper electrode 304; a second lower electrode 306 located on the first protective layer 305; a second electrochromic material 307 located on the second lower electrode 306 as a second color filter unit through which a second color light transmits; a second upper electrode 308 located on the second electrochromic material 307; a second protective layer 309 located on the second upper electrode 308; a third lower electrode 310 located on the second protective layer 309; a third electrochromic material 311 located on the third lower electrode 310 as a third color filter unit through which a third color light transmits; a third upper electrode 312 located on the third electrochromic material 311; and a second substrate 313 located on the third upper electrode 312.

In an exemplary embodiment, the first, second and third color lights may be a red light, a green light and a blue light, respectively. The first electrochromic material 303, the second electrochromic material 307 and the third electrochromic material 311 are asynchronously applied with a voltage to asynchronously acquire a red image, a green image and a blue image.

FIG. 4 is a schematic diagram schematically illustrating a cross-section of a liquid crystal filter element 40 according to an embodiment of the present disclosure. As shown in FIG. 4, the liquid crystal filter element 40 comprises: a first substrate 401; a second substrate 411 disposed opposite to the first substrate 401; a first color filter unit 402, a second color filter unit 403 and a third color filter unit 404 located between the first substrate 401 and the second substrate 411, the first color filter unit 402, the second color filter unit 403 and third color filter unit 404 being located in the same layer; a protective layer 405 located between the second substrate 411 and the first color filter unit 402, the second color filter unit 403 and third color filter unit 404; a first electrode 406, a second electrode 407 and a third electrode 408 located between the second substrate 411 and the protective layer 405, the first electrode 406, the second electrode 407 and the third electrode 408 being located in the same layer; a common electrode 410 located between the second substrate 411 and the first electrode 406, the second electrode 407 and the third electrode 408; and a liquid crystal 409 located between the common electrode 410 and the first electrode 406, the second electrode 407 and the third electrode 408.

In an exemplary embodiment, the liquid crystal 409 comprises a ferroelectric liquid crystal. It should be understood that other types of liquid crystals may also be used in the embodiments of the present disclosure.

In an exemplary embodiment, the first color filter unit 402, the second color filter unit 403 and the third color filter unit 404 are a red pigment, a green pigment and a blue pigment, respectively. The liquid crystal 409 on the first color filter unit 402, the second color filter unit 403 and the third color filter unit 404 are driven asynchronously to filter lights of different colors asynchronously, thereby acquiring a red image, a green image and a blue image asynchronously.

In the embodiments described herein, there is further provided a pixel circuit, comprising a display unit as described above so as to realize image display and image acquisition. An exemplary pixel circuit provided by the embodiments of the present disclosure will now be described in detail with reference to FIG. 5.

Figure 5:
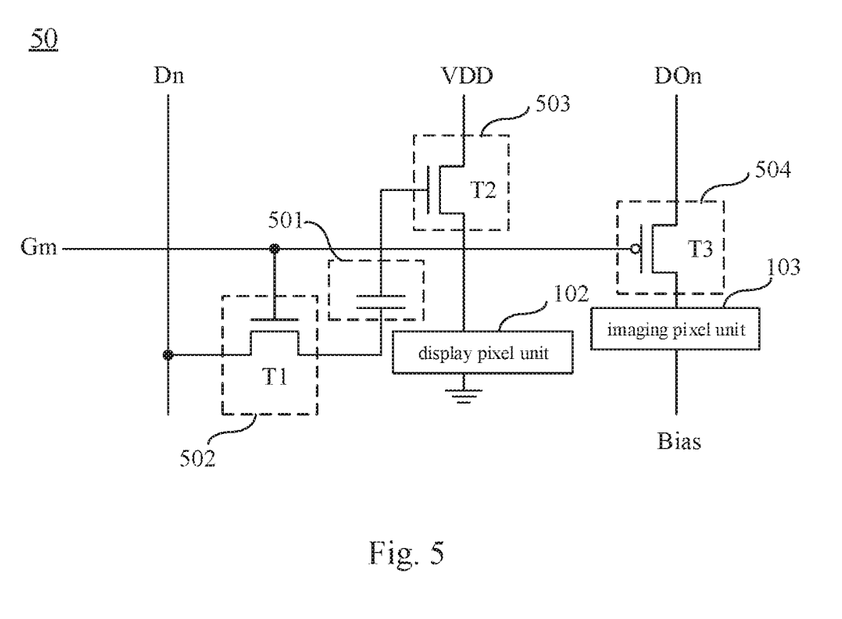
FIG. 5 is a schematic diagram schematically illustrating a pixel circuit 50 according to an embodiment of the present disclosure.

FIG. 5 is a schematic diagram schematically illustrating a pixel circuit 50 according to an embodiment of the present disclosure. As shown in FIG. 5, the pixel circuit 50 comprises: a storage capacitor 501; a data write circuit 502 configured to control a data voltage to be written into a first terminal of the storage capacitor 501; a display control circuit 503 configured to control the display pixel unit 102 in the display unit 10 to display images; the display pixel unit 102 configured to display images; an imaging control circuit 504 configured to control the imaging pixel unit 103 in the display unit 10 to acquire images; and the imaging pixel unit 103 configured to acquire images.

In an exemplary embodiment, the data write circuit 502 comprises a first transistor T1. A control electrode of the first transistor T1 is coupled to a scan line Gm, a first electrode of the first transistor T1 is coupled to a data line Dn, and a second electrode of the first transistor T1 is coupled to the first terminal of the storage capacitor 501.

In an exemplary embodiment, the display control circuit 503 comprises a second transistor T2. A control electrode of the second transistor T2 is coupled to a second terminal of the storage capacitor 501, a first electrode of the second transistor T2 is coupled to the display pixel unit 102, and a second electrode of the second transistor T2 is configured to receive a power supply voltage.

In an exemplary embodiment, the imaging control circuit 504 comprises a third transistor T3. A control electrode of the third transistor T3 is coupled to the scan line Gm, a first electrode of the third transistor T3 is coupled to the imaging pixel unit 103, and a second electrode of the third transistor T3 is coupled to an imaging signal output terminal DOn.

In an exemplary embodiment, a Bias terminal in FIG. 5 is a reference voltage signal terminal corresponding to a photosensitive element 1031 in the imaging pixel unit 103. The reference voltage signal is associated with the specific device characteristics of the photosensitive element 1031, which is not specifically limited in the present disclosure.

In an exemplary embodiment, the second transistor T2 and the first transistor T1 are of the same type, and the third transistor T3 and the first transistor T1 are of different types. In an exemplary embodiment, the first transistor T1 and the second transistor T2 are N-type transistors, and the third transistor is a P-type transistor. In another exemplary embodiment, the first transistor T1 and the second transistor T2 are P-type transistors, and the third transistor is an N-type transistor. It should be noted that the following description is directed to the situation where the first transistor T1 and the second transistor T2 are N-type transistors and the third transistor is a P-type transistor. It should be appreciated by those skilled in the art that, as for the situation where the first transistor T1 and the second transistor T2 are P-type transistors and the third transistor is an N-type transistor, the same function can be realized simply by changing the voltages of the control electrodes of the transistors to the opposite polarity, and the details will not be repeated herein.

In the embodiments described herein, there is further provided a method for driving a pixel circuit 50 as described above to realize image display and image acquisition. A method for driving a pixel circuit provided by the embodiments of the present disclosure will now be described in detail with reference to FIGS. 6 to 8.

Figure 6:
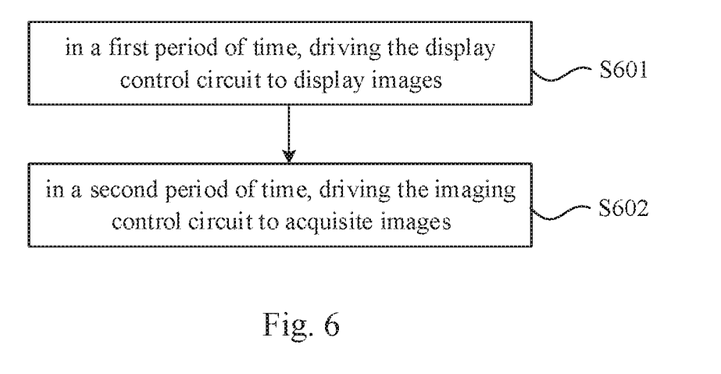
FIG. 6 is a flowchart of a method for driving a pixel circuit according to an embodiment of the present disclosure.
Figure 8:
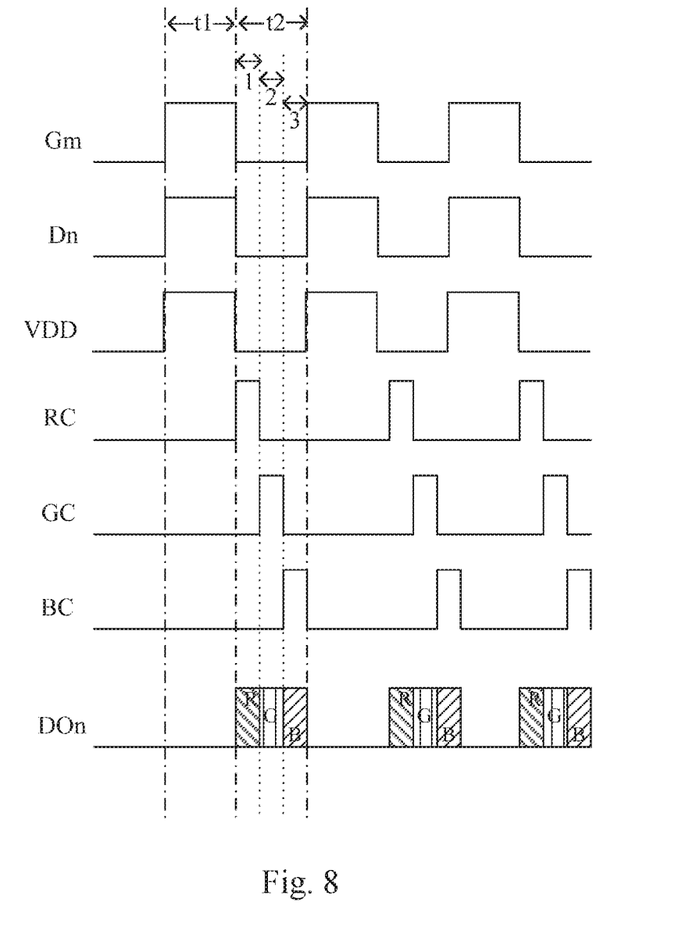
FIG. 8 is a diagram of a timing chart of signals of a pixel circuit according to an embodiment of the present disclosure.

FIG. 6 is a flowchart of a method for driving a pixel circuit 50 according to an embodiment of the present disclosure. FIG. 8 is a diagram of a timing chart of signals of a pixel circuit 50 according to an embodiment of the present disclosure. As shown in FIGS. 6 and 8, at step S601, in a first period of time t1, the display control circuit 503 is driven to display images; and at step S602, in a second period of time t2, the imaging control circuit 504 is driven to acquire images.

Figure 7:
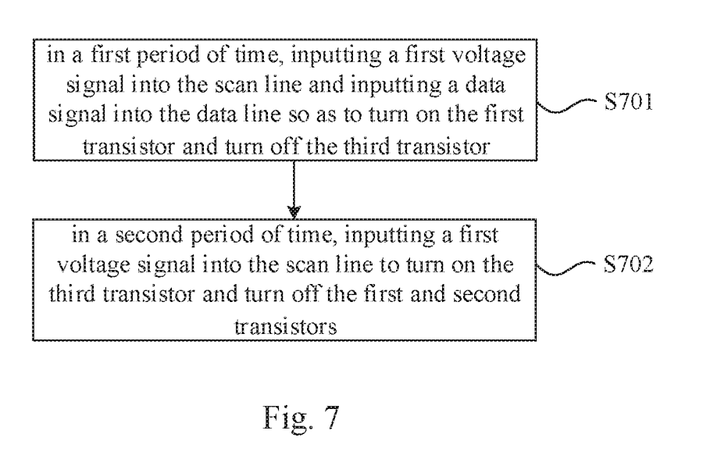
FIG. 7 is a specific flowchart of a method for driving a pixel circuit according to an embodiment of the present disclosure.

FIG. 7 is a specific flowchart of a method for driving a pixel circuit 50 according to an embodiment of the present disclosure. As shown in FIGS. 7 and 8, at step S701, in the first period of time t1, a first voltage signal is a high level signal, and the first voltage signal is input into the scan line Gm to turn on the first transistor T1 and turn off the third transistor T3, a data signal is input into the data line Dn to charge the storage capacitor 501 to turn on the second transistor T2, so as to drive the display pixel unit 102 to emit a light, and thus enable the display unit 10 to display images.

At step S702, in the second period of time t2, a first voltage signal is a low level signal, and the first voltage signal is input into the scan line Gm to turn on the third transistor T3 and turn off the first transistor T1 and the second transistor T3, so as to output an image signal acquired by the imaging pixel unit 103 from the imaging signal output terminal DOn, and thus enable the display 10 to acquire images.

In an exemplary embodiment, as shown in FIG. 8, the second period of time t2 may sequentially comprise a first sub-period 1, a second sub-period 2 and a third sub-period 3. Those skilled in the art should understand that the first to third sub-periods may be the same or different. In an exemplary embodiment, an imaging control signal is transmitted to the imaging pixel unit 103 in a time division manner by a controller (described later). For instance, the controller transmits a first imaging control signal to the imaging pixel unit 103 in the first sub-period 1, a second imaging control signal to the imaging pixel unit 103 in the second sub-period 2 and a third imaging control signal to the imaging pixel unit 103 in the third sub-period 3. Thus, in the first sub-period 1, a first image signal of a first color is acquired by the imaging pixel unit 103. In the second sub-period 2, a second image signal of a second color is acquired by the imaging pixel unit 103. In the third sub-period 3, a third image signal of a third color is acquired by the imaging pixel unit 103. In an exemplary embodiment, as shown in FIG. 8, the first, second and third imaging control signals are a red imaging control signal RC, a green imaging control signal GC and a blue imaging control signal BC, respectively. The first, second and third colors are red, green and blue, respectively. The first, second and third image signals are red, green and blue image signals, respectively. However, the embodiments of the present disclosure do not limit the order of acquiring the different color images, and those skilled in the art may select an order of acquiring the different color images according to the needs. In addition, as shown in FIG. 8, in the second period of time t2, the imaging signal output terminal DOn asynchronously outputs the red, green and blue image signals.

In the embodiments described herein, there is further provided a display panel comprising the pixel circuits as described above. An exemplary display panel provided by the embodiments of the present disclosure will now be described in detail with reference to FIGS. 9 and 10.

Figure 9:
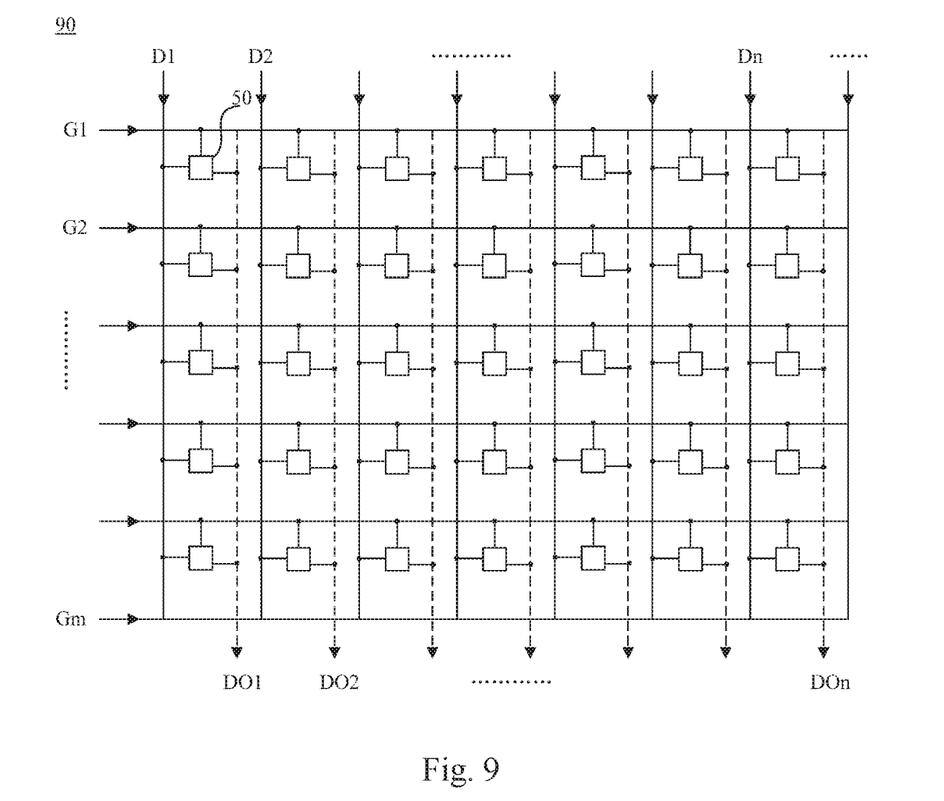
FIG. 9 is a structural diagram schematically illustrating a display panel 90 according to an embodiment of the present disclosure.

FIG. 9 is a structural diagram schematically illustrating a display panel 90 according to an embodiment of the present disclosure. As shown in FIG. 9, the display panel 90 comprises a plurality of pixel circuits 50, a plurality of scan lines, a plurality of data lines and a plurality of imaging signal output lines. Each pixel circuit 50 is connected to a corresponding scan line, a corresponding data line and a corresponding imaging signal output line.

Figure 10:
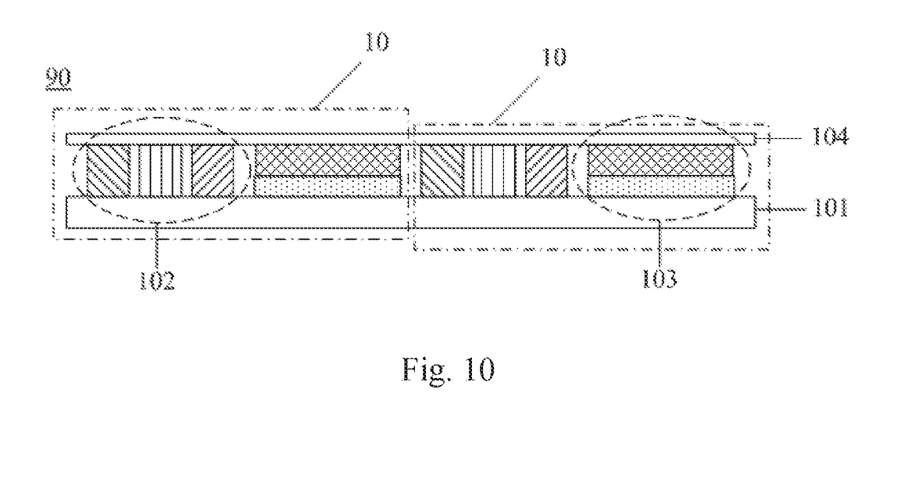
FIG. 10 is a cross-sectional view schematically illustrating a display panel 90 according to an embodiment of the present disclosure.

FIG. 10 is a cross-sectional view schematically illustrating a display panel 90 according to an embodiment of the present disclosure. As shown in FIG. 10, the display panel 90 comprises a substrate 101, a display pixel unit 102 and an imaging pixel unit 103 located on the substrate 101, and a protective layer 104 located on the display pixel unit 102 and the imaging pixel unit 103. As described above, the display panel 90 comprises a plurality of pixel circuits 50. The plurality of pixel circuits 50 comprise a plurality of display units 10. The plurality of display units 10 comprise a plurality of display pixel units 102 and a plurality of imaging pixel units 103. In an exemplary embodiment, the imaging pixel unit 103 is located between the display pixel units 102.

In the embodiments described herein, there is further provided a display device comprises the display panel as described above. An exemplary display device provided by the embodiments of the present disclosure will now be described in detail with reference to FIG. 11.

Figure 11:
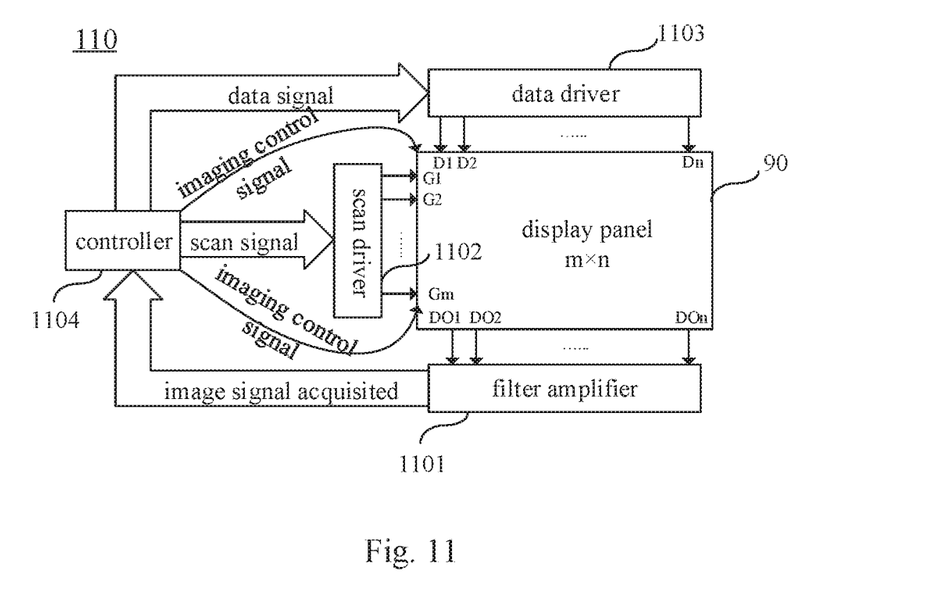
FIG. 11 is a block diagram schematically illustrating a display device 110 according to an embodiment of the present disclosure.

FIG. 11 is a block diagram schematically illustrating a display device 110 according to an embodiment of the present disclosure. As shown in FIG. 11, the display device 110 comprises: a display panel 90; a filter amplifier 1101 for amplifying an image signal from the imaging pixel unit 103 in the display panel 90; a scan driver 1102 and a data driver 1103 for driving the display panel 90; and a controller 1104 for receiving the image signals from the filter amplifier 1101, transmitting the scan signals (G1, G2 . . . Gm) and the data signals (D1, D2 . . . Dn) to the scan driver 1102 and the data driver 1103, respectively, and transmitting an imaging control signal for controlling the imaging pixel unit 103 to the display panel 90. The imaging control signal is configured to control the imaging pixel unit in the display panel to acquire images. In an exemplary embodiment, the imaging pixel unit may acquire images of different colors, e.g. red, green and blue images.

As an example, the controller 1104, the filter amplifier 1101, the scan driver 1102 and the data driver 1103 included in the display device 110 are present independently of the display panel 90. It may be appreciated that the controller, the filter amplifier, the scan driver and the data driver may also be formed integrally with the display panel.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the application, and all such modifications are included within the scope of the application.

What is claimed is:

1. A pixel circuit, comprising:
a display unit comprising:
a display pixel for displaying images; and
an imaging pixel for acquiring images, the imaging pixel comprising a photosensitive sensor and a filter located on the photosensitive sensor, the photosensitive sensor configured to sense brightness of an external image and convert the brightness into an electric signal when acquiring the images, the filter comprising an electrochromic filter or a liquid crystal filter;
wherein the electrochromic filter comprises:
a first substrate;
a second substrate disposed opposite to the first substrate,
a common electrode disposed between the first substrate and the second substrate;
a first electrode, a second electrode and a third electrode located between the common electrode and the second substrate, the first electrode the second electrode and the third electrode located in the same layer; and
a first electrochromic material located between the common electrode and the first electrode as a first color filter through which a first color light transmits, a second electrochromic material located between the common electrode and the second electrode as a second color filter through which a second color light transmits, and a third electrochromic material located between the common electrode and the third electrode as a third color filter through which a third color light transmits;
a storage capacitor;
a data write circuit configured to control a data voltage to be written into a first terminal of the storage capacitor;
a display control circuit configured to control the display pixel in the display unit to display images; and
an imaging control circuit configured to control the imaging pixel in the display unit to acquire images,
wherein the imaging control circuit comprises a first transistor, a second transistor and a third transistor having a control electrode coupled to the scan line, a first electrode coupled to the imaging pixel, and a second electrode coupled to an imaging signal output terminal, wherein the second transistor and the first transistor are of the same type, and wherein the third transistor and the first transistor are of different types.

2. The pixel circuit according to claim 1, wherein the data write circuit includes a first transistor having a control electrode coupled to a scan line, a first electrode coupled to a data line, and a second electrode coupled to the first terminal of the storage capacitor.

3. The pixel circuit according to claim 2, wherein the display control circuit includes a second transistor having a control electrode coupled to a second terminal of the storage capacitor, a first electrode coupled to the display pixel, and a second electrode configured to receive a power supply voltage.

4. A display panel, comprising a plurality of pixel circuits including the pixel circuit according to claim 3, wherein imaging pixels of the plurality of pixel circuits are located between display pixels.

5. A display panel, comprising a plurality of pixel circuits including the pixel circuit according to claim 2, wherein imaging pixels of the plurality of pixel circuits are located between display pixels.

6. A method for driving the pixel circuit according to claim 1, comprising:
in a first period of time, driving the display control circuit to display images; and
in a second period of time, driving the imaging control circuit to acquire images.

7. A display panel, comprising a plurality of pixel circuits including the pixel circuit according to claim 1, wherein imaging pixels of the plurality of pixel circuits are located between display pixels.

8. A pixel circuit, comprising:
a display unit comprising
a display pixel for displaying images; and
an imaging pixel for acquiring images, the imaging pixel comprising a photosensitive sensor and a filter located on the photosensitive sensor, the photosensitive sensor configured to sense brightness of an external image and convert the brightness into an electric signal when acquiring the images. the filter comprising an electrochromic filter or a liquid crystal filter;
wherein the electrochromic filter comprises:
a first substrate;
a second substrate disposed opposite to the first substrate;
a common electrode disposed between the first substrate and the second substrate;
a first electrode, a second electrode and a third electrode located between the common electrode and the second substrate, the first electrode, the second electrode and the third electrode located in the same layer; and
a first electrochromic material located between the common electrode and the first electrode as a first color filter through which a first color light transmits, a second electrochromic material located between the common electrode and the second electrode as a second color filter through which a second color light transmits, and a third electrochromic material located between the common electrode and the third electrode as a third color filter through which a third color light transmits;

a storage capacitor;
a first transistor;
a second transistor; and
a third transistor, wherein:
a control electrode of the first transistor is coupled to a scan line, a first electrode of the first transistor is coupled to a data line, a second electrode of the first transistor is coupled to a first terminal of the storage capacitor;
a control electrode of the second transistor is coupled to a second terminal of the storage capacitor, a first electrode of the second transistor is coupled to the display pixel of the display unit, and a second electrode of the second transistor is configured to receive a power supply voltage;
a control electrode of the third transistor is coupled to the scan line, a first electrode of the third transistor is coupled to the imaging pixel in the display unit, and a second electrode of the third transistor is coupled to an imaging signal output terminal; and
the second transistor and the first transistor are of the same type, and the third transistor and the first transistor are of different types.

9. A method for driving the pixel circuit according to claim 8, comprising:
in a first period of time, inputting a first voltage signal into the scan line to turn on the first transistor and turn off the third transistor, and inputting a data signal into the data line to charge the storage capacitor to turn on the second transistor to drive the display pixel to emit a light; and
in a second period of time, inputting a first voltage signal into the scan line to turn on the third transistor and turn off the first and second transistors so as to output an image signal acquired by the imaging pixel from the imaging signal output terminal.

10. The method according to claim 9, wherein in the second period of time, the imaging pixel asynchronously acquires a first image signal of a first color, a second image signal of a second color, and a third image signal of a third color.

11. A display panel, comprising a plurality of pixel circuits including the pixel circuit according to claim 8, wherein imaging pixels of the plurality of pixel circuits are located between display pixels.

* * * * *